(12) United States Patent
Safai

(10) Patent No.: US 10,801,973 B2
(45) Date of Patent: Oct. 13, 2020

(54) COMPOSITE STRUCTURE BONDLINE INSPECTION

(71) Applicant: The Boeing Company, Chicago, IL (US)

(72) Inventor: Morteza Safai, Newcastle, WA (US)

(73) Assignee: The Boeing Company, Chicago, IL (US)

(*) Notice: Subject to any disclaimer, the term of this patent is extended or adjusted under 35 U.S.C. 154(b) by 14 days.

(21) Appl. No.: 16/151,934

(22) Filed: Oct. 4, 2018

(65) Prior Publication Data
US 2020/0110045 A1 Apr. 9, 2020

(51) Int. Cl.
*G01N 23/00* (2006.01)
*G01N 23/083* (2018.01)

(52) U.S. Cl.
CPC ....... *G01N 23/083* (2013.01); *G01N 2223/30* (2013.01); *G01N 2223/505* (2013.01)

(58) Field of Classification Search
CPC ............. G01N 23/083; G01N 2223/30; G01N 2223/505
See application file for complete search history.

(56) References Cited

U.S. PATENT DOCUMENTS

| | | | | |
|---|---|---|---|---|
| 4,926,452 A | * | 5/1990 | Baker | G01N 23/043 250/358.1 |
| 5,245,648 A | * | 9/1993 | Kinney | G01N 23/046 378/145 |
| 7,130,375 B1 | | 10/2006 | Yun et al. | |
| 7,400,704 B1 | * | 7/2008 | Yun | G01N 23/044 378/79 |
| 2003/0021376 A1 | | 1/2003 | Smith | |
| 2006/0163501 A1 | * | 7/2006 | Yun | G01T 1/20 250/503.1 |
| 2014/0064445 A1 | * | 3/2014 | Adler | G21K 7/00 378/43 |

OTHER PUBLICATIONS

Wang et al., "The optical lens coupled X-ray in-line phase contrast imaging system for the characterization of low Z materials," Review of Scientific Instruments, vol. 89, 2018, 6 pages.
European Patent Office, Partial Search Report, dated Mar. 17, 2020, regarding Application No. 19196436.0, 12 pages.

* cited by examiner

*Primary Examiner* — Hugh Maupin
(74) *Attorney, Agent, or Firm* — Yee & Associates, P.C.

(57) ABSTRACT

An X-ray inspection system is presented. The X-ray inspection system comprises an X-ray source, an X-ray scintillator, a light detector, a first objective lens, and a second objective lens. The first objective lens is positioned between the X-ray scintillator and the light detector. The second objective lens is positioned between the first objective lens and the light detector.

20 Claims, 6 Drawing Sheets

COMPOSITE STRUCTURE BONDLINE INSPECTION

BACKGROUND INFORMATION

1. Field

The present disclosure relates generally to inspecting composite structures and, more specifically, to inspecting a bondline in a composite structure. More particularly, the present disclosure relates to a method and apparatus for inspecting a bondline in a composite structure using X-rays.

2. Background

Currently, there are no methods to ensure accurate and reliable bond strength in composite manufacturing. Inconsistencies may be introduced into a bondline during manufacturing of a composite structure. The inconsistencies may lead to undesirably high re-work and scrap rates.

Currently, composite bond strength is not quantifiable using conventional non-destructive techniques. The inconsistencies in the bondline may be difficult to detect visually or by using non-destructive testing. Some types of inconsistencies in the bondline of a composite structure, such as microporosity, crystallization, and kissing disbonds, may not be currently detectable using non-destructive inspection techniques. Further, the non-destructive testing of the bondline may be at least one of undesirably time-consuming or undesirably costly. Therefore, it would be desirable to have a method and apparatus that take into account at least some of the issues discussed above, as well as other possible issues.

SUMMARY

An illustrative embodiment of the present disclosure provides an X-ray inspection system. The X-ray inspection system comprises an X-ray source, an X-ray scintillator, a light detector, a first objective lens, and a second objective lens. The first objective lens is positioned between the X-ray scintillator and the light detector. The second objective lens is positioned between the first objective lens and the light detector.

Another illustrative embodiment of the present disclosure provides a bondline inspection system. The bondline inspection system comprises an X-ray source assembly, an X-ray detection assembly, and an alignment system. The X-ray detection assembly comprises an X-ray scintillator, at least two objective lenses, and a light detector. The alignment system is physically associated with both the X-ray source assembly and the X-ray detection assembly.

A further illustrative embodiment of the present disclosure provides a method of inspecting a bondline within a composite structure. X-rays are sent into a first surface of the composite structure. X-rays are received at an X-ray scintillator from a second surface of the composite structure. Light is generated from the X-rays received at the X-ray scintillator. The light generated from the X-rays received at the X-ray scintillator is magnified by a first objective lens to form magnified light. The magnified light is directed to a light detector using a second objective lens. Whether the bondline has a desired quality is determined using an output from the light detector.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
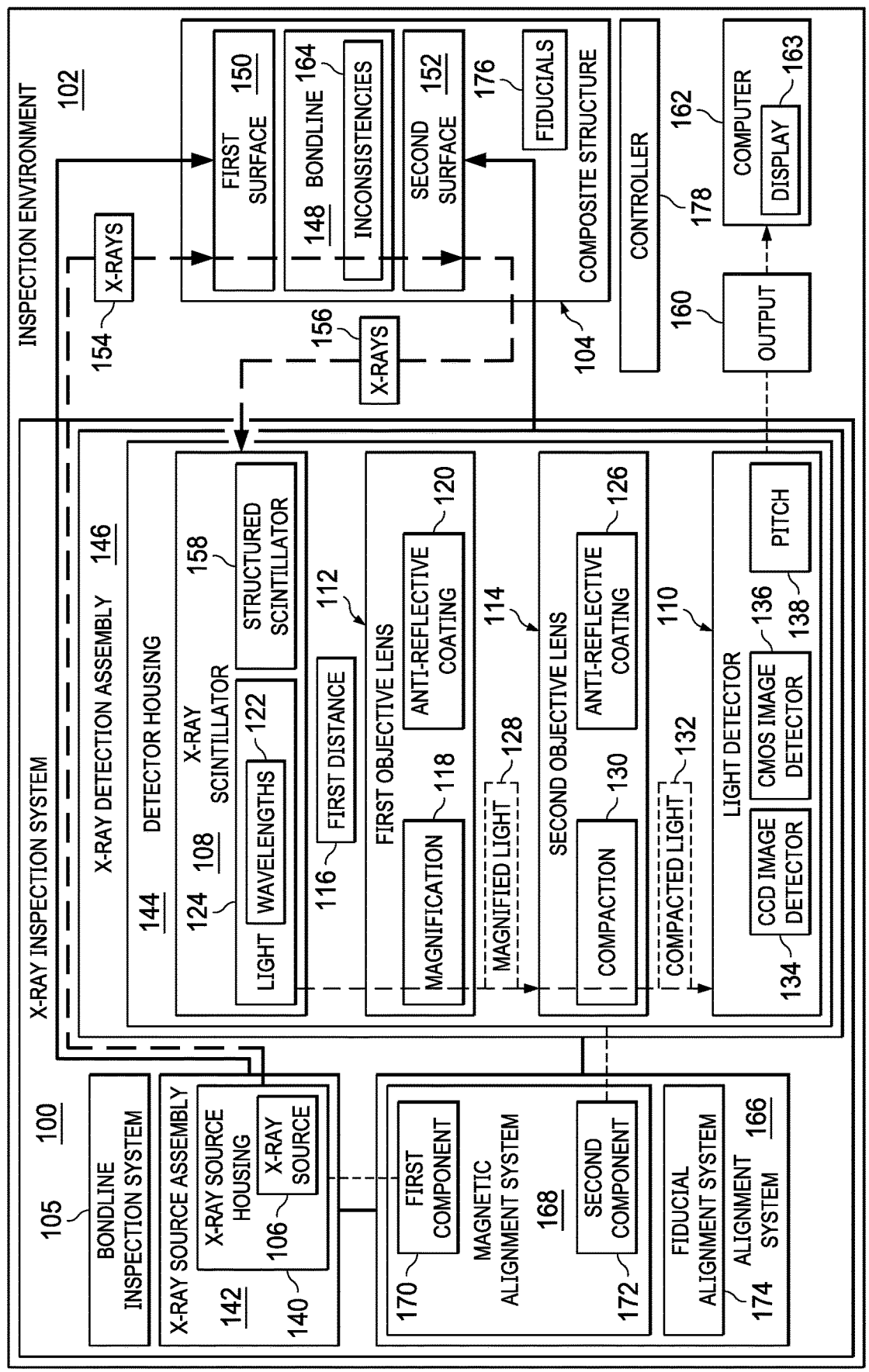
FIG. 1 is an illustration of a block diagram of an inspection environment in accordance with an illustrative embodiment.

The illustrative embodiments recognize and take into account one or more different considerations. For example, the illustrative embodiments recognize and take into account that conventional non-destructive techniques, such as high frequency ultrasound, do not determine small variations in the bondline due to undesirable curing. A laser bond inspection device (LBID) may be used to determine bondline integrity. However, a laser bond inspection device (LBID) may also undesirably break the bondline during the laser bond inspection process. Currently the only way to test bondline integrity is by means of a pull test, which is destructive.

The illustrative embodiments recognize and take into account that bondlines in composite structures may be formed using fasteners, co-curing composite portions, bonding the composite portions by curing a bonding adhesive, or by other desirable methods. Fasteners may be used as reinforcement for the bondlines of the composite structures. Fasteners may be used as a failsafe for the composite structures having the bondlines. The fasteners are used as a failsafe because conventional inspection techniques do not provide strength measurements of the bondline.

The illustrative embodiments recognize and take into account that the fasteners add to a weight of an aircraft. Removing the fasteners will reduce the weight of the aircraft and improve weight-dependent performance features of the aircraft. The illustrative embodiments additionally recognize and take into account that providing non-destructive inspection for the bondline may allow for bondlines without failsafe fasteners.

The illustrative embodiments recognize and take into account that conventional X-ray inspection is undesirable for detecting microporosity and other types of inconsistencies in bondlines in composite structures. Conventional X-ray inspection has undesirably low resolution.

The illustrative embodiments recognize and take into account that characteristics of X-ray inspection include a number of pixels of a detector and a flux of X-rays from the X-ray source. Increasing the size of the detector without changing the number of pixels reduces the resolution of the inspection. Increasing the number of pixels without increasing the flex of X-rays, the contrast of the data from the detector is reduced.

The illustrative embodiments recognize and take into account that microchannel plates are used in X-ray inspection to amplify signals. Environmental light undesirably affects the microchannel plates. Environmental light may effectively disable the microchannel plates.

The illustrative embodiments recognize and take into account that X-ray scintillators receive X-rays and generate visible light. X-ray scintillators include structured scintillators and powder scintillators. Powder scintillators include powder having different orientations. Powder scintillators scatter light due to the powder orientation.

The illustrative embodiments recognize and take into account that structured scintillators having material in an ordered structure scatters less light than powder scintillators. Structured scintillators are formed of crystals. Structured scintillators may also be referred to as crystal scintillators. Structured scintillators having material in an ordered structure scatter less light than powder scintillators.

The illustrative embodiments recognize and take into account that X-ray complementary metal-oxide-semiconductor (CMOS) detectors are used in dental imaging and other small medical imaging. X-ray CMOS detectors may be undesirable in imaging larger areas. Inspecting large areas using X-ray CMOS detectors may take an undesirable amount of time.

The illustrative embodiments recognize and take into account that geometrical distortion is created in x-ray imaging. Geometrical distortion increases the difficulty of detecting inconsistencies in the bondline of a composite structure. The illustrative embodiments recognize and take into account that it would be desirable to reduce aberration and geometrical distortion in x-ray inspection of composite structures.

The illustrative embodiments recognize and take into account that optical systems comprise different lens types. Different lens types perform different functions. For example, relay lenses are used to invert an image or extend the length of a system. As another example, an objective lens, or a series of objective lenses, is used to focus light. An objective lens can be used to reduce or eliminate distortion.

The illustrative examples provide an X-ray inspection system. The X-ray inspection system comprises an X-ray source, an X-ray scintillator, a light detector, and at least two objective lenses.

Turning now to FIG. 1, an illustration of a block diagram of an inspection environment is depicted in accordance with an illustrative embodiment. X-ray inspection system 100 is present in inspection environment 102. X-ray inspection system 100 may be used to inspect composite structure 104. In some illustrative examples, X-ray inspection system 100 may be referred to as bondline inspection system 105.

X-ray inspection system 100 comprises X-ray source 106, X-ray scintillator 108, light detector 110, first objective lens 112, and second objective lens 114. First objective lens 112 is positioned between X-ray scintillator 108 and light detector 110. Second objective lens 114 is positioned between first objective lens 112 and light detector 110.

First objective lens 112 is positioned such that first objective lens 112 is first distance 116 from X-ray scintillator 108. First distance 116 is selected such that first objective lens 112 provides magnification 118. In some illustrative examples, first distance 116 is adjustable.

First objective lens 112 has a diameter sufficient to receive all of light 124 emitted by X-ray scintillator 108. First objective lens 112 is large enough to focus and collimate light 124 from X-ray scintillator 108.

First objective lens 112 has anti-reflective coating 120 configured to selectively block light having wavelengths 122 of light 124 emitted by X-ray scintillator 108. Wavelengths 122 emitted by X-ray scintillator 108 is in a specific window. In some illustrative examples, wavelengths 122 emitted by X-ray scintillator 108 is described as high frequency. In some illustrative examples, wavelengths 122 emitted by X-ray scintillator 108 is described as in the green region of visible light.

Anti-reflective coating 120 is selected to selectively block light having wavelengths 122. Anti-reflective coating 120 reduces or prevents light being reflected from first objective lens 112 back to X-ray scintillator 108. In some illustrative examples, anti-reflective coating 120 reduces noise in X-ray inspection system 100. In some illustrative examples, anti-reflective coating 120 reduces exterior light from outside of X-ray inspection system 100. Anti-reflective coating 120 reduces or prevents ghost images in X-ray scintillator 108.

Second objective lens 114 has anti-reflective coating 126 configured to selectively block light having wavelengths 122 of light 124 emitted by X-ray scintillator 108. Anti-reflective coating 126 is selected to selectively block light having wavelengths 122. Anti-reflective coating 126 reduces or prevents light being reflected from second objective lens 114 back to X-ray scintillator 108. In some illustrative examples, anti-reflective coating 126 reduces noise in X-ray inspection system 100. In some illustrative examples, anti-reflective coating 126 reduces exterior light from outside of X-ray inspection system 100. Anti-reflective coating 126 reduces or prevents ghost images in X-ray scintillator 108.

First objective lens 112 and second objective lens 114 are configured to receive, magnify, and direct light 124 generated from X-rays 156 received at X-ray scintillator 108. First objective lens 112 and second objective lens 114 together focus light 124 onto a smaller area than the surface area of X-ray scintillator 108. First objective lens 112 magnifies light 124 received from X-ray scintillator 108 to form magnified light 128. Second objective lens 114 receives and compacts magnified light 128.

Second objective lens 114 is configured to provide compaction 130 of magnified light 128. Compaction 130 of magnified light 128 provides improved image quality. Compaction 130 of magnified light 128 provides a reduction in distortion. Second objective lens 114 reduces or eliminates negative effects of first objective lens 112 on light 124. For example, second objective lens 114 reduces or eliminates pincushion, barrel distortion, horizontal non-linearity and vertical non linearity to provide improved image quality. Second objective lens 114 compacts and directs magnified light 128 to form compacted light 132 directed to light detector 110.

Light detector 110 comprises one of charge-coupled device (CCD) image detector 134 or complementary metal-oxide-semiconductor (CMOS) image detector 136. Light detector 110 has pitch 138 of at least 20 microns, where a micron is a millionth of a meter. Pitch 138 is a measured distance from one pixel to another pixel of light detector 110.

In some illustrative examples, X-ray source 106 is positioned within X-ray source housing 140. X-ray source assembly 142 includes X-ray source housing 140 and X-ray source 106.

In some illustrative examples, X-ray scintillator 108, light detector 110, first objective lens 112, and second objective lens 114 are positioned within detector housing 144. X-ray detection assembly 146 includes detector housing 144 and components within detector housing 144.

To inspect bondline 148 of composite structure 104, X-ray source assembly 142 is positioned relative to first surface 150 of composite structure 104. X-ray source assembly 142 is positioned such that X-ray source 106 faces first surface 150. In some illustrative examples, X-ray source assembly 142 is positioned such that X-ray source housing 140 is in contact with first surface 150.

X-ray detection assembly 146 is positioned relative to second surface 152 of composite structure 104. Second surface 152 is an opposite surface of first surface 150 about bondline 148 of composite structure 104. In some illustrative examples, second surface 152 may be described as being on a second side of composite structure 104.

X-ray detection assembly 146 is positioned such that X-ray scintillator 108 is positioned between light detector 110 and second surface 152. In some illustrative examples, X-ray detection assembly 146 is positioned such that detector housing 144 is in contact with second surface 152.

To inspect bondline 148, X-ray source 106 directs X-rays 154 into first surface 150 of composite structure 104. In some illustrative examples, first surface 150 may be described as being on a first side of composite structure 104.

X-ray source 106 takes any desirable form. In some illustrative examples, X-ray source 106 is a macro X-ray source. In some illustrative examples, x-ray source 106 comprises micro focus tubes. In some illustrative examples, when x-ray source 106 comprises at least one micro focus tube, resolution is increased for an image produced by light detector 110. Micro focus tubes generate very small focal spot sizes, typically below 50 μm in diameter. In some illustrative examples, X-ray source 106 is a micro-focused X-ray tube.

X-ray scintillator 108 receives X-rays 156 that traveled through first surface 150, bondline 148, and second surface 152. X-ray scintillator 108 generates light 124 from X-rays 156 received.

In some illustrative examples, X-ray scintillator 108 is structured scintillator 158. Structured scintillator 158 is formed of crystals growing in a structured format.

Light 124 travels to first objective lens 112. First objective lens 112 receives light 124 and forms magnified light 128. Magnified light 128 is received by second objective lens 114. Second objective lens 114 forms compacted light 132 from magnified light 128.

Light detector 110 receives compacted light 132 and forms output 160. Output 160 is sent to computer 162. A determination is made using output 160 whether bondline 148 has a desired quality. In some illustrative examples, output 160 may be referred to as sensor data. In some illustrative examples, an image formed using output 160 is displayed on display 163 of computer 162. In some illustrative examples, the determination is performed based on information displayed on display 163. In some illustrative examples, the determination is performed based on an image on display 163.

In some illustrative examples, inconsistencies 164 in bondline 148 are identified. Inconsistencies 164 include any type of inconsistency present in bondline 148. In some illustrative examples, inconsistencies 164 comprise microporosity. In some illustrative examples, inconsistencies 164 comprise crystallization. In some illustrative examples, inconsistencies 164 comprise a kissing disbond.

X-ray detection assembly 146 is configured to maximize the flux collected. X-ray detection assembly 146 is configured to receive and process X-rays 156 to minimize loss of X-rays 156. For example, X-ray detection assembly 146 is sized to collect substantially all X-rays 156 exiting second surface 152. X-ray detection assembly 146 includes structured scintillator 158 rather than a powder scintillator to reduce loss of X-rays 156 during generation of light 124.

To collect as much of X-rays 156 exiting second surface 152 as possible, X-ray detection assembly 146 is aligned relative to X-ray source assembly 142. X-ray inspection system 100 has alignment system 166. Alignment system 166 takes any desirable form. Alignment system 166 is configured to align X-ray source assembly 142 and X-ray detection assembly 146 relative to each other.

In some illustrative examples, alignment system 166 takes the form of magnetic alignment system 168. When alignment system 166 takes the form of magnetic alignment system 168, first component 170 of magnetic alignment system 168 is connected to X-ray source housing 140, and second component 172 of magnetic alignment system 168 is connected to detector housing 144.

When alignment system 166 takes the form of magnetic alignment system 168, one of X-ray source housing 140 or detector housing 144 may be moved by magnetic force of magnetic alignment system 168 when the other of X-ray source housing 140 or detector housing 144 is moved. A magnetic force of magnetic alignment system 168 enables alignment of X-ray source assembly 142 and X-ray detection assembly 146. Alignment of X-ray source assembly 142 relative to X-ray detection assembly 146 affects collection of X-rays 156. If X-ray source assembly 142 and X-ray detection assembly 146 are offset, X-ray detection assembly 146 will collect only a portion of X-rays 156.

When alignment system 166 takes the form of magnetic alignment system 168, X-ray inspection system 100 may be maneuvered by an operator. When alignment system 166 takes the form of magnetic alignment system 168, automated movement of X-ray inspection system 100 may be simplified. For example, when alignment system 166 takes the form of magnetic alignment system 168, X-ray source assembly 142 may be maneuvered by an automated system while X-ray detection assembly 146 is moved by magnetic attraction of magnetic alignment system 168.

As depicted, alignment system 166 comprises one of magnetic alignment system 168 or fiducial alignment system 174. In some illustrative examples, alignment system 166 is a combination of magnetic alignment system 168 and fiducial alignment system 174. For example, fiducial alignment system 174 may be used to initially position X-ray source assembly 142 and X-ray detection assembly 146 relative to composite structure 104. After initially positioning X-ray source assembly 142 and X-ray detection assembly 146, magnetic alignment system 168 may be used to precisely position X-ray source assembly 142 and X-ray detection assembly 146 relative to each other.

In some illustrative examples, alignment system 166 takes the form of fiducial alignment system 174. When alignment system 166 comprises fiducial alignment system 174, fiducials 176 are located on or near composite structure 104 for alignment of X-ray inspection system 100. When alignment system 166 takes the form of fiducial alignment system 174, X-ray inspection system 100 is maneuvered by controller 178.

Controller 178 is configured to position X-ray detection assembly 146 relative to X-ray source assembly 142. Controller 178 is configured to position light detector 110 relative to X-ray source 106. Controller 178 may be implemented in at least one of hardware or software. Controller 178 may be a processor unit in a computer system or a specialist circuit depending on the particular implementation.

Bondline inspection system 105 comprises X-ray source assembly 142, X-ray detection assembly 146, and alignment system 166. X-ray detection assembly 146 comprises X-ray scintillator 108, at least two objective lenses, and light detector 110. Alignment system 166 is physically associated with both X-ray source assembly 142 and X-ray detection assembly 146.

Including at least two objective lenses reduces or eliminates chromatic aberrations. The at least two objective lenses are positioned within X-ray detection assembly 146 to magnify and compact light 124 from X-ray scintillator 108. Although two objective lenses, first objective lens 112 and second objective lens 114, are depicted, any desirable quantity of objective lenses may be present in bondline inspection system 105. In some illustrative examples, more than two objective lenses are present in bondline inspection system 105. In some illustrative examples, bondline inspection system 105 has three objective lenses, four objective lenses, or more than four objective lenses. Increasing a quantity of objective lenses within X-ray detection assembly 146 increases the magnification provided within X-ray detection assembly 146. Increasing a quantity of objective lenses also increases the complexity of X-ray detection assembly 146.

Each objective lens in addition to first objective lens 112 improves image quality as system detection capability, however each additional lens adds additional cost and complexity to the system. In some illustrative examples, a quantity of objective lenses in x-ray detection assembly 146 is selected based on a desired image quality for inspecting bondline 148 for small porosity, voids, or other small inconsistencies.

X-ray inspection system 100 is configured to provide inspection for qualification of composite structure 104 with bondline 148. X-ray inspection system 100 is configured to send X-rays 154 into a surface area of between one to five inches of first surface 150. X-ray inspection system 100 is configured to provide inspection for composite structure 104 with bondline 148 having a thickness of 0.1 to 0.25 inches.

The illustration of inspection environment 102 in FIG. 1 is not meant to imply physical or architectural limitations to the manner in which an illustrative embodiment may be implemented. Other components in addition to, or in place of, the ones illustrated may be used. Some components may be unnecessary. Also, the blocks are presented to illustrate some functional components. One or more of these blocks may be combined, divided, or combined and divided into different blocks when implemented in an illustrative embodiment.

For example, although fiducials 176 and fiducial alignment system 174 are depicted, alignment system 166 may take any desirable form. For example, alignment system 166 may take the form of a laser tracking alignment system.

In some non-depicted examples, x-ray inspection system 100 comprises a third objective lens. In these non-depicted examples, the third objective lens is positioned between second objective lens 114 and light detector 110. In some other non-depicted examples, x-ray inspection system 100 further comprises a fourth objective lens between the third objective lens and light detector 110.

Figure 2:
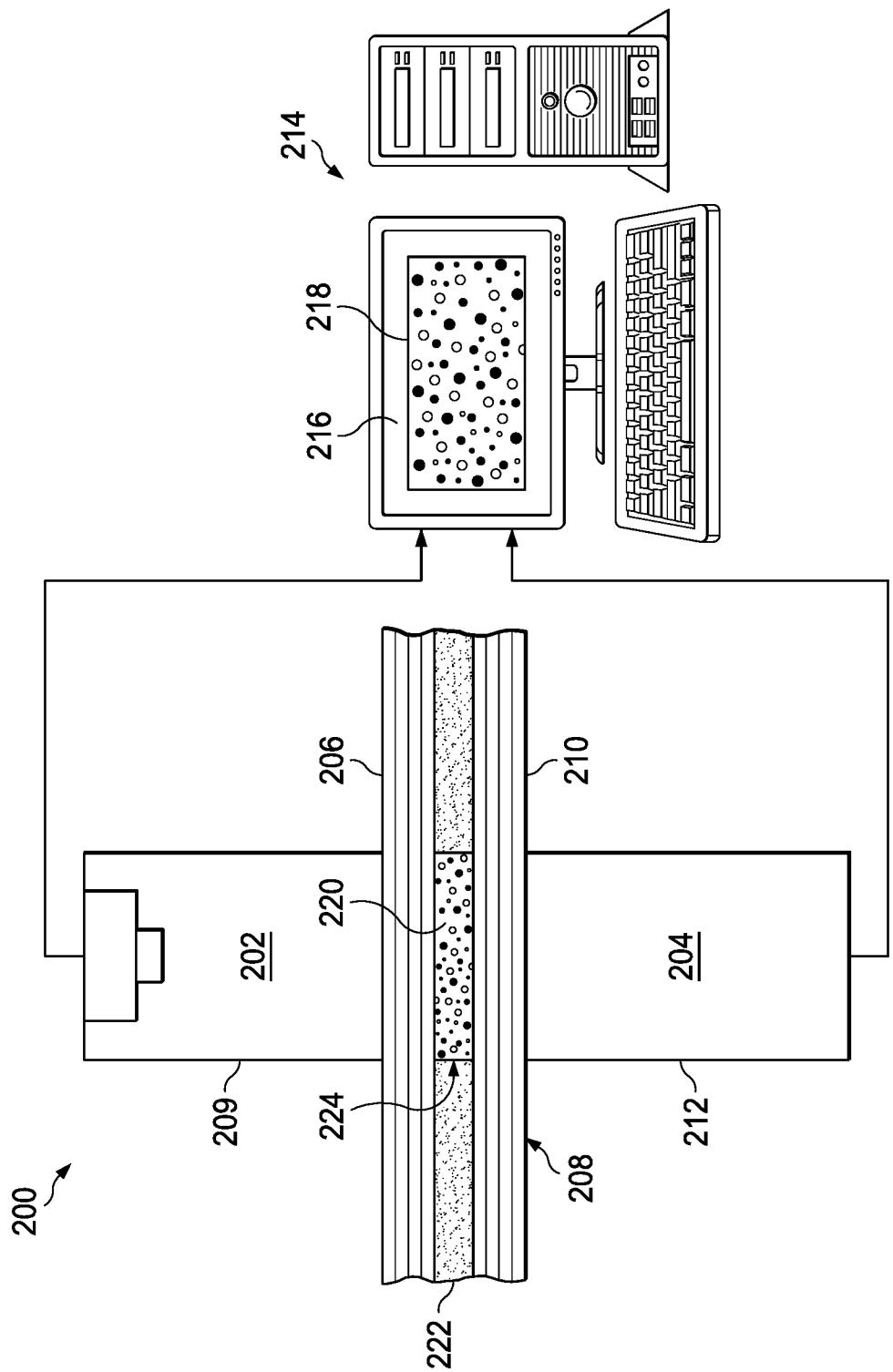
FIG. 2 is an illustration of an X-ray inspection system in accordance with an illustrative embodiment.

Turning now to FIG. 2, an illustration of an X-ray inspection system is depicted in accordance with an illustrative embodiment. X-ray inspection system 200 is a physical implementation of X-ray inspection system 100 of FIG. 1. X-ray inspection system 200 comprises X-ray source assembly 202 and X-ray detection assembly 204. X-ray source assembly 202 is a physical implementation of X-ray source assembly 142 of FIG. 1.

X-ray source assembly 202 is positioned relative to first surface 206 of composite structure 208. X-ray source assembly 202 is configured to send X-rays (not depicted) into first surface 206 of composite structure 208. An X-ray source (not depicted) is present within housing 209 of X-ray source assembly 202.

X-ray detection assembly 204 is a physical implementation of X-ray detection assembly 146 of FIG. 1. X-ray detection assembly 204 is positioned relative to second surface 210 of composite structure 208. X-ray detection assembly 204 receives X-rays (not depicted) that travel through composite structure 208.

An X-ray scintillator (not depicted), at least two objective lenses (not depicted), and a light detector (not depicted) are present inside of detector housing 212 of X-ray detection assembly 204. X-ray detection assembly 204 is in electronic communication with computer system 214.

As depicted, display 216 of computer system 214 is displaying image 218. Image 218 is created from output of the light detector of X-ray detection assembly 204. Image 218 may be used to determine if inconsistencies are present in bondline 222. Image 218 may be used to determine if a desired quality is present for bondline 222.

As depicted, inconsistencies 220 are present in bondline 222 of composite structure 208. X-ray source assembly 202 and X-ray detection assembly 204 are positioned to inspect portion 224 of bondline 222 having inconsistencies 220. Inconsistencies 220 are visible in image 218.

Figure 3:
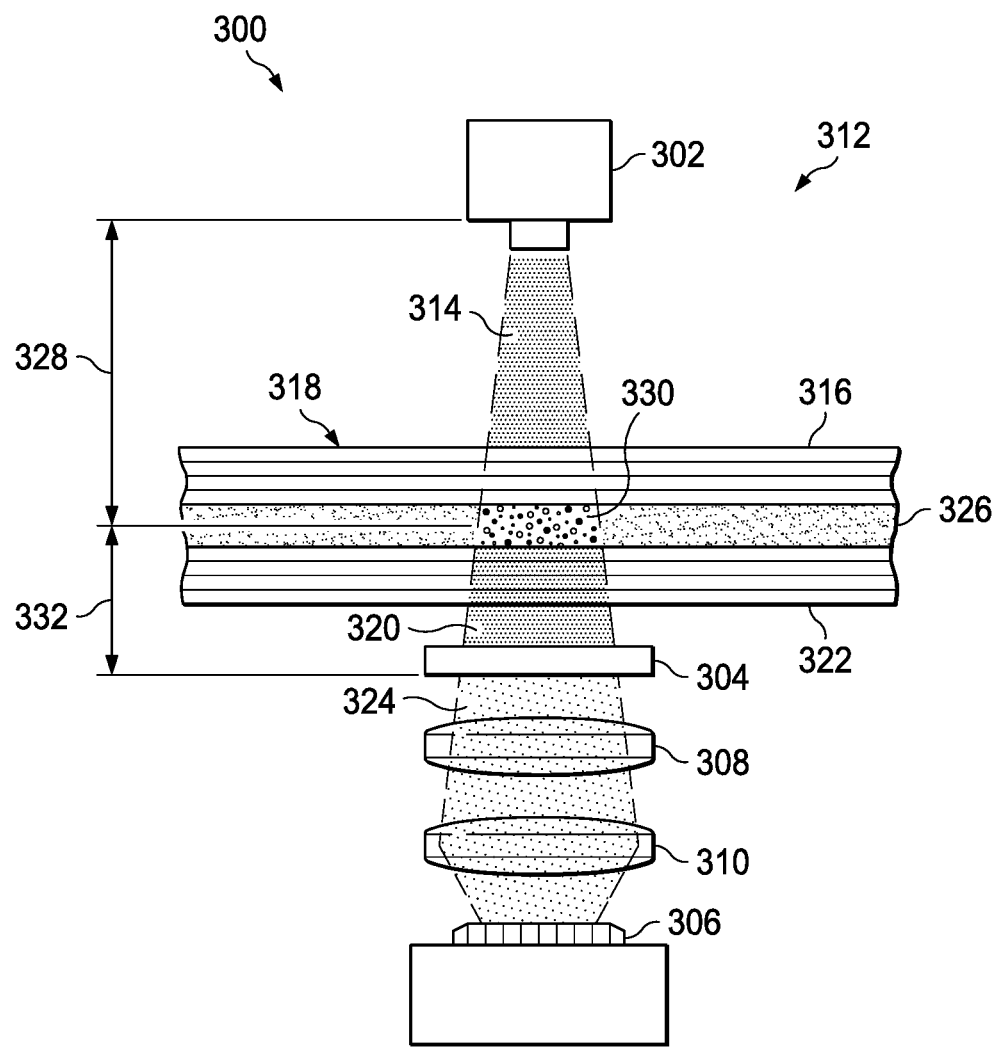
FIG. 3 is an illustration of an X-ray inspection system in accordance with an illustrative embodiment.

Turning now to FIG. 3, an illustration of an X-ray inspection system is depicted in accordance with an illustrative embodiment. X-ray inspection system 300 is a physical implementation of X-ray inspection system 100 of FIG. 1. X-ray inspection system 300 comprises X-ray source 302, X-ray scintillator 304, light detector 306, first objective lens 308, and second objective lens 310. First objective lens 308 is positioned between X-ray scintillator 304 and light detector 306. Second objective lens 310 is positioned between first objective lens 308 and light detector 306.

View 312 is a simplified view of X-ray inspection system 100 of FIG. 1. Although not depicted in view 312, X-ray inspection system 100 may further comprise other components, such as at least a number of housings, a controller, an alignment system, or any other desirable components.

X-ray source 302 directs X-rays 314 into first surface 316 of composite structure 318. X-rays 314 enter composite structure 318 and travel through composite structure 318. X-ray scintillator 304 receives X-rays 320 exiting composite structure 318 at second surface 322.

X-ray scintillator 304 receives X-rays 320 and generates light 324. First objective lens 308 magnifies light 324 generated from X-rays 320 received at X-ray scintillator 304. Second objective lens 310 concentrates the magnified light from first objective lens 308.

Second objective lens 310 directs compacted light to light detector 306. Output (not depicted) of light detector 306 is used to determine if a desired quality is present in bondline 326 of composite structure 318.

X-ray inspection system 300 provides images with sufficient resolution to detect inconsistencies within bondline 326 of composite structure 318. X-ray inspection system 300 is configured to provide sufficient resolution and sufficient contrast to detect kissing disbonds, microporosity, crystallization, or other types of inconsistencies within bondline 326.

To provide sufficient resolution, distances between components are set to provide sufficient magnification and collect substantially all of the X-rays and maximize the collection of the generated light. A ratio of distance 328 between X-ray source 302 and sample 330 and distance 332 between sample 330 and X-ray scintillator 304 is selected to provide a desired magnification.

The illustration of X-ray inspection system 300 in FIG. 3 is not meant to imply physical or architectural limitations to the manner in which an illustrative embodiment may be implemented. Other components in addition to, or in place of, the ones illustrated may be used. For example, in some non-depicted illustrative examples, X-ray inspection system 300 may include more than two objective lenses.

In some non-depicted examples, x-ray inspection system 300 comprises a third objective lens. In these non-depicted examples, the third objective lens is positioned between second objective lens 310 and light detector 306. In some other non-depicted examples, x-ray inspection system 300 further comprises a fourth objective lens between the third objective lens and light detector 306.

The different components shown in FIGS. 2-3 may be combined with components in FIG. 1, used with components in FIG. 1, or a combination of the two. Additionally, some of the components in FIGS. 2-3 may be illustrative examples of how components shown in block form in FIG. 1 may be implemented as physical structures.

Figure 4:
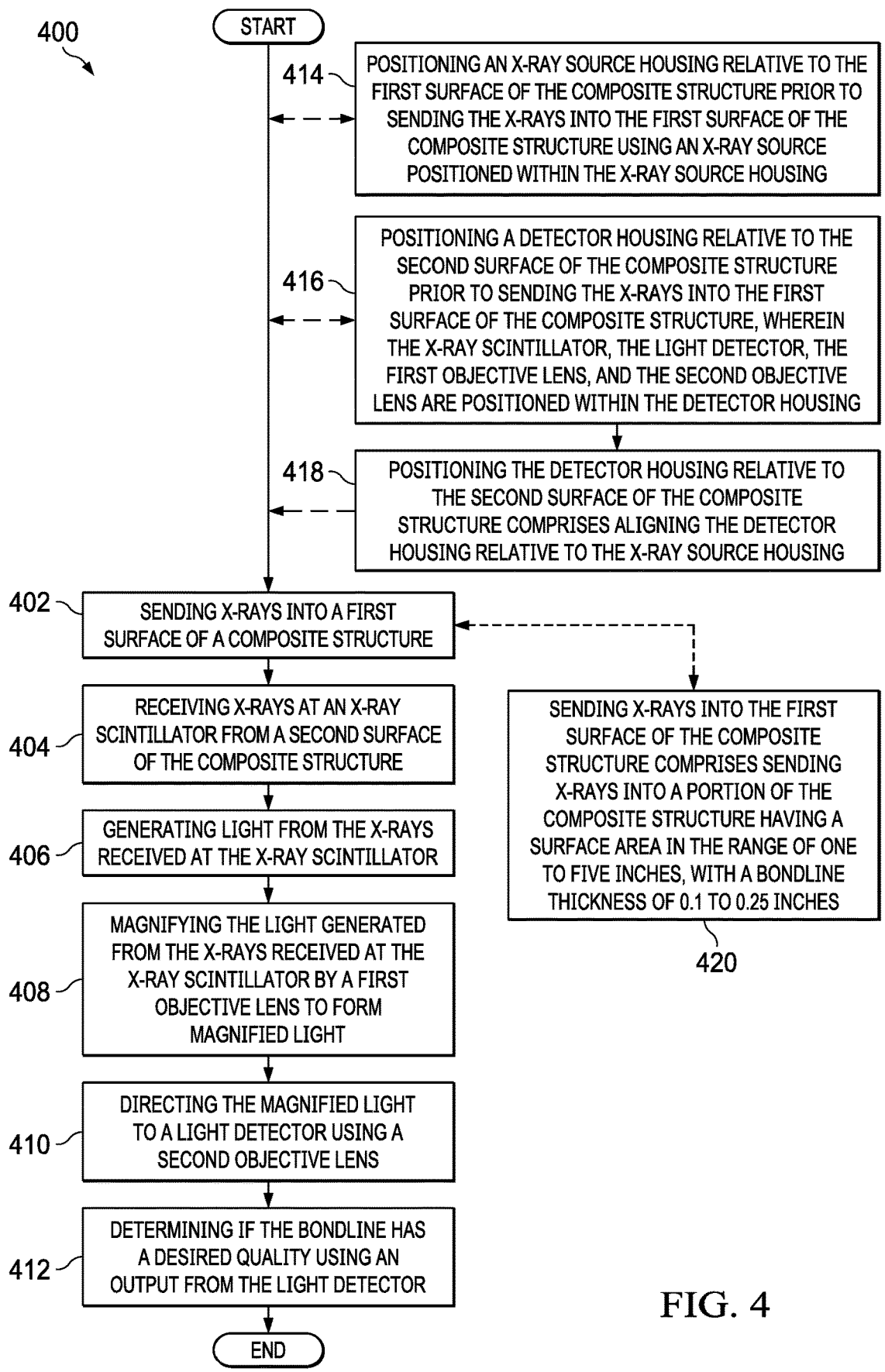
FIG. 4 is an illustration of a flowchart of a method for inspecting a bondline within a composite structure in accordance with an illustrative embodiment.

Turning now to FIG. 4, an illustration of a flowchart of a method for inspecting a bondline within a composite structure is depicted in accordance with an illustrative embodiment. Method 400 is a method of inspecting bondline 148 within composite structure 104 of FIG. 1. Method 400 may be performed using X-ray inspection system 100 of FIG. 1. Method 400 may be used to inspect bondline 222 within composite structure 208 of FIG. 2. Method 400 may be performed using X-ray inspection system 200 of FIG. 2. Method 400 may be used to inspect bondline 326 within composite structure 318 of FIG. 3. Method 400 may be performed using X-ray inspection system 300 of FIG. 3.

Method 400 sends X-rays into a first surface of a composite structure (operation 402). Method 400 receives X-rays at an X-ray scintillator from a second surface of the composite structure (operation 404). Method 400 generates light from the X-rays received at the X-ray scintillator (operation 406). Method 400 magnifies the light generated from the X-rays received at the X-ray scintillator by a first objective lens to form magnified light (operation 408). Method 400 directs the magnified light to a light detector using a second objective lens (operation 410). Method 400 determines if the bondline has a desired quality using an output from the light detector (operation 412). Afterwards, method 400 terminates.

In some illustrative examples, method 400 positions an X-ray source housing relative to the first surface of the composite structure prior to sending the X-rays into the first surface of the composite structure using an X-ray source positioned within the X-ray source housing (operation 414). In some illustrative examples, method 400 further comprises positioning a detector housing relative to the second surface of the composite structure prior to sending the X-rays into the first surface of the composite structure, wherein the X-ray scintillator, the light detector, the first objective lens, and the second objective lens are positioned within the detector housing (operation 416).

In some illustrative examples, method 400 further comprises positioning the detector housing relative to the second surface of the composite structure comprises aligning the detector housing relative to the X-ray source housing (operation 418).

In some illustrative examples, method 400 further comprises sending X-rays into the first surface of the composite structure comprises sending X-rays into a portion of the composite structure having a surface area in the range of one to five inches, with a bondline thickness of 0.1 to 0.25 inches (operation 420). The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. Some blocks may be optional. For example, in method 400, operations 414 through 420 may be optional.

Figure 5:
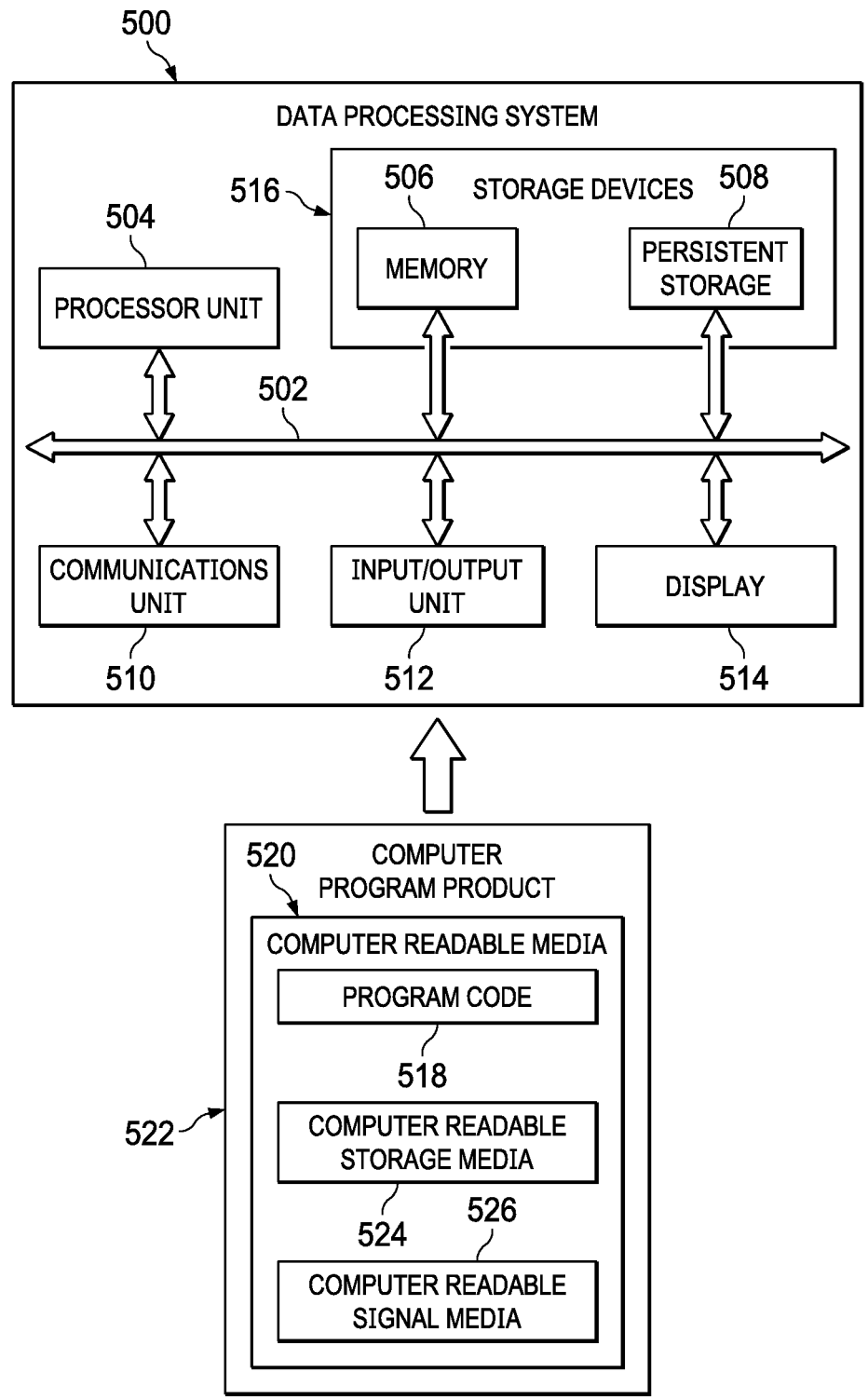
FIG. 5 is an illustration of a data processing system in a form of a block diagram in accordance with an illustrative embodiment.

Turning now to FIG. 5, an illustration of a data processing system in a form of a block diagram is depicted in accordance with an illustrative embodiment. Data processing system 500 may be used to implement at least one of computer 162 or controller 178 of FIG. 1.

In this illustrative example, data processing system 500 includes communications fabric 502. Communications fabric 502 provides communications between processor unit 504, memory 506, persistent storage 508, communications unit 510, input/output (I/O) unit 512, and display 514. Memory 506, persistent storage 508, communications unit 510, input/output (I/O) unit 512, and display 514 are examples of resources accessible by processor unit 504 via communications fabric 502.

Processor unit 504 serves to run instructions for software that may be loaded into memory 506. Processor unit 504 may be a number of processors, a multi-processor core, or some other type of processor, depending on the particular implementation. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and other suitable information either on a temporary basis or a permanent basis. Storage devices 516 also may be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output (I/O) unit 512 allows for input and output of data with other devices that may be connected to data processing system 500. For example, input/output (I/O) unit 512 may provide a connection for user input through a keyboard, a mouse, and/or some other suitable input device. Further, input/output (I/O) unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer-implemented instructions, which may be located in a memory, such as memory 506.

These instructions are referred to as program instructions, program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500.

In these examples, computer readable storage media 524 is a physical or tangible storage device used to store program code 518 rather than a medium that propagates or transmits program code 518. Computer readable storage media 524 is also referred to as a computer readable tangible storage device or a computer readable physical storage device. In other words, computer readable storage media 524 is a media that can be touched by a person.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to and/or in place of those illustrated for data processing system 500. Other components shown in FIG. 5 can be varied from the illustrative examples shown. The different embodiments may be implemented using any hardware device or system capable of running program code. As one example, data processing system 500 may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 518 may be omitted, because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518.

With this depicted example, some of the processes may be implemented in the number of hardware units, while other processes may be implemented in the number of processors.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system.

Additionally, communications unit 510 may include a number of devices that transmit data, receive data, or both transmit and receive data. Communications unit 510 may be, for example, a modem or a network adapter, two network adapters, or some combination thereof. Further, a memory may be, for example, memory 506, or a cache, such as that found in an interface and memory controller hub that may be present in communications fabric 502.

Figure 6:
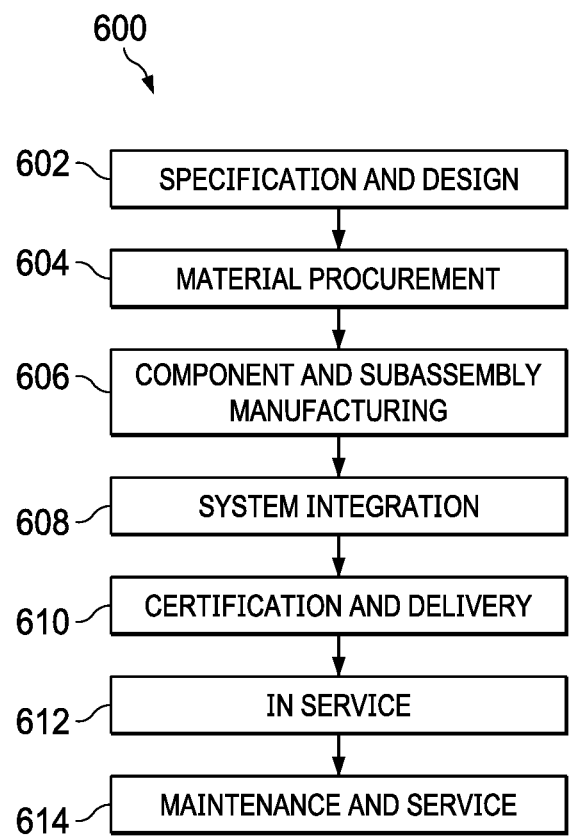
FIG. 6 is an illustration of an aircraft manufacturing and service method in a form of a block diagram in accordance with an illustrative embodiment.
Figure 7:
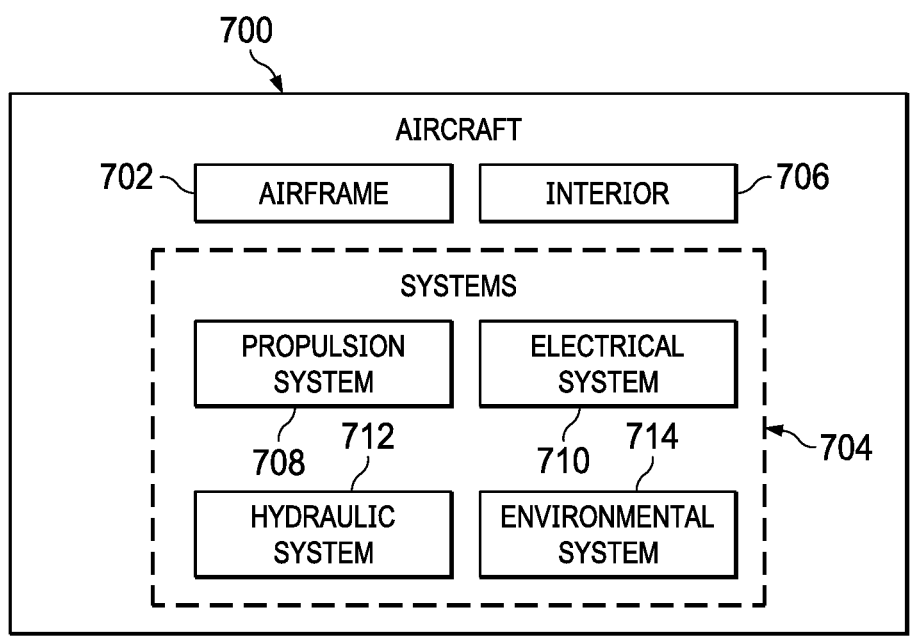
FIG. 7 is an illustration of an aircraft in a form of a block diagram in which an illustrative embodiment may be implemented.

Illustrative embodiments of the present disclosure may be described in the context of aircraft manufacturing and service method 600 as shown in FIG. 6 and aircraft 700 as shown in FIG. 7. Turning first to FIG. 6, an illustration of an aircraft manufacturing and service method is depicted in accordance with an illustrative embodiment. During pre-production, aircraft manufacturing and service method 600 may include specification and design 602 of aircraft 700 in FIG. 7 and material procurement 604.

During production, component and subassembly manufacturing 606 and system integration 608 of aircraft 700 takes place. Thereafter, aircraft 700 may go through certification and delivery 610 in order to be placed in service 612. While in service 612 by a customer, aircraft 700 is scheduled for routine maintenance and service 614, which may include modification, reconfiguration, refurbishment, or other maintenance and service.

Each of the processes of aircraft manufacturing and service method 600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 7, an illustration of an aircraft is depicted in which an illustrative embodiment may be implemented. In this example, aircraft 700 is produced by aircraft manufacturing and service method 600 of FIG. 6 and may include airframe 702 with plurality of systems 704 and interior 706. Examples of systems 704 include one or more of propulsion system 708, electrical system 710, hydraulic system 712, and environmental system 714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 600. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

One or more illustrative embodiments may be used during at least one of component and subassembly manufacturing 606, system integration 608, or maintenance and service 614 of FIG. 6. For example, X-ray inspection system 100 of FIG. 1 may be used during component and subassembly manufacturing 606 to inspect composite structure 104 of FIG. 1. X-ray inspection system 100 may be used to inspect portions of aircraft 700 such as airframe 702 or portions of interior 706.

The illustrative embodiments provide an X-ray inspection system and methods for inspecting a composite structure. The illustrative embodiments provide a method to nondestructively verify bondline integrity of a bonded composite structure.

The illustrative embodiments use phase contrast imaging in combination with microscopic imaging and high resolution nano-focus X-ray technology. The illustrative embodiments provide a system to conduct spot checks of bondline integrity by super high-resolution X-ray imaging and microscopy. The illustrative embodiments are capable of detecting small anomalies and change in a bondline after curing, such as micro-porosity, crystallization, or kissing disbonds. The illustrative embodiments utilize nano-focus X-ray magnification and optical scintillation magnification.

The X-ray inspection system of the illustrative examples may be undesirably time-consuming for wide area inspection. The X-ray inspection system of the illustrative examples may be used to create three-dimensional images. By means of stereo imaging, a three-dimensional image of bondline adhesive can be created. A three-dimensional image may be used to verify the bondline integrity. The three-dimensional image may be used to provide process control verification.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An X-ray inspection system comprising:
an X-ray source positioned within an X-ray source housing;
an X-ray scintillator;
a light detector;
a first objective lens positioned between the X-ray scintillator and the light detector;
a second objective lens positioned between the first objective lens and the light detector, wherein the X-ray scintillator, the light detector, the first objective lens, and the second objective lens are positioned within a detector housing; and a magnetic alignment system, wherein a first component of the magnetic alignment system is connected to the X-ray source housing and a second component of the magnetic alignment system is connected to the detector housing.

2. The X-ray inspection system of claim 1, wherein the first objective lens is positioned such that the first objective lens is a distance from the X-ray scintillator.

3. The X-ray inspection system of claim 2, wherein the distance is selected such that the first objective lens provides magnification.

4. The X-ray inspection system of claim 1, wherein the light detector comprises one of a charge-coupled device (CCD) image detector or a complementary metaloxidesemiconductor (CMOS) image detector.

5. The X-ray inspection system of claim 1 wherein the X-ray source housing is in contact with a first surface of a composite structure to be inspected or the detector housing is in contact with a second surface of the composite structure to be inspected.

6. The X-ray inspection system of claim 1, wherein a magnetic force of the magnetic alignment system moves one of the X-ray source housing or the detector housing when the other of the X-ray source housing or the detector housing is moved.

7. The X-ray inspection system of claim 1, wherein the first objective lens has an anti-reflective coating configured to selectively block light having wavelengths of light emitted by the X-ray scintillator.

8. The X-ray inspection system of claim 1, wherein the second objective lens has an anti-reflective coating configured to selectively block light having wavelengths of light emitted by the X-ray scintillator.

9. The X-ray inspection system of claim 1, wherein the X-ray scintillator is a structured scintillator.

10. The X-ray inspection system of claim 1, wherein the light detector has a pitch of at least 20 microns.

11. The X-ray inspection system of claim 1 further comprising:
a controller configured to position the light detector relative to the X-ray source.

12. A bondline inspection system comprising:
an X-ray source assembly positioned within an X-ray source housing;
an X-ray detection assembly positioned within a detector housing, the X-Ray detection assembly comprising an X-ray scintillator, a first objective lens, a second objective lens, and a light detector; and
an alignment system physically associated with both the X-ray source housing and the detector housing;
wherein the first objective lens is positioned between the X-ray scintillator and the light detector at a distance from the X-ray scintillator.

13. The bondline inspection system of claim 12, wherein the alignment system comprises one of a magnetic alignment system or a fiducial alignment system.

14. The bondline inspection system of claim 12 further comprising:
a controller configured to position the X-ray detection assembly relative to the X-ray source assembly.

15. The bondline inspection system of claim 12, wherein the X-ray scintillator is a structured scintillator.

16. The bondline inspection system of claim 12, wherein the first objective lens and the second objective lens are positioned within the X-ray detection assembly to magnify and compact light from the X-ray scintillator.

17. A method of inspecting a bondline within a composite structure, the method comprising:
positioning an X-ray source housing relative to a first surface of the composite structure, wherein an X-ray source is positioned within the X-ray source housing;
positioning a detector housing relative to a second surface of the composite structure, wherein an X-ray scintillator, a light detector, a first objective lens, and a second objective lens are positioned within the detector housing;
aligning the detector housing relative to the X-ray source housing using an alignment system, wherein the alignment system is physically associated with the X-ray source housing and the detector housing;
sending X-rays from the X-ray source into the first surface of the composite structure;
receiving X-rays at the X-ray scintillator from the second surface of the composite structure;
generating light from the X-rays received at the X-ray scintillator;
magnifying the light generated from the X-rays received at the X-ray scintillator by the first objective lens to form magnified light;
directing the magnified light to the light detector using the second objective lens, wherein the first objective lens is positioned between the X-ray scintillator and the light detector; and
determining if the bondline has a desired quality using an output from the light detector.

18. The method of claim 17 further comprising:
positioning the X-ray source housing in contact with the first surface of the composite structure prior to sending the X-rays into the first surface of the composite structure; or
positioning the detector housing in contact with the second surface of the composite structure prior to sending the X-rays into the first surface of the composite structure.

19. The method of claim 17, wherein a magnetic force of the alignment system moves one of the X-ray source housing or the detector housing when the other of the X-ray source housing or the detector housing is moved.

20. The method of claim 17, wherein sending the X-rays into the first surface of the composite structure comprises sending the X-rays into a portion of the composite structure having a surface area in a range of one to five inches, with a bondline thickness of 0.1 to 0.25 inches.

* * * * *